United States Patent
Yu et al.

(10) Patent No.: US 8,934,489 B2
(45) Date of Patent: Jan. 13, 2015

(54) ROUTING DEVICE AND METHOD FOR PROCESSING NETWORK PACKET THEREOF

(71) Applicant: Gemtek Technology Co., Ltd., Hukou Township, Hsinchu County (TW)

(72) Inventors: Chien-Tse Yu, Guishan Township, Taoyuan County (TW); Bo-Jun Liu, Hukou Township, Hsinchu County (TW)

(73) Assignee: Gemtek Technology Co., Ltd., Hsinchu County (TW)

( * ) Notice: Subject to any disclaimer, the term of this patent is extended or adjusted under 35 U.S.C. 154(b) by 99 days.

(21) Appl. No.: 13/755,979

(22) Filed: Jan. 31, 2013

(65) Prior Publication Data

US 2014/0211799 A1 Jul. 31, 2014

(51) Int. Cl.
*H04L 12/28* (2006.01)
*H04L 12/741* (2013.01)

(52) U.S. Cl.
CPC .................................. *H04L 45/745* (2013.01)
USPC ...... 370/392; 370/395.31; 370/401; 370/475; 709/238; 709/245

(58) Field of Classification Search
None
See application file for complete search history.

(56) References Cited

U.S. PATENT DOCUMENTS

| 6,754,214 | B1 * | 6/2004 | Mahalingaiah | 370/392 |
| 2004/0049701 | A1 * | 3/2004 | Le Pennec et al. | 713/201 |
| 2007/0189312 | A1 * | 8/2007 | Acharya et al. | 370/401 |

* cited by examiner

*Primary Examiner* — Chi H Pham
*Assistant Examiner* — Shick Hom
(74) *Attorney, Agent, or Firm* — Muncy, Geissler, Olds & Lowe, P.C.

(57) ABSTRACT

A method for processing a network packet is used for a routing apparatus. The routing apparatus includes a forwarding engine module and a core module. In the method, a network packet from a source interface is received. Whether or not the network packet meets a Network Address Translation (NAT) packet condition is determined. Subsequently, the following steps are executed when the network packet meets the NAT packet condition. In these steps, transmission information of the network packet is read and a NAT mapping table is searched by using the transmission information. When a mapping entry corresponding to the transmission information is found in the NAT mapping table, the method involves enabling the forwarding engine module to update the header of the network packet according to the NAT forwarding information of the corresponding mapping entry and set a destination interface of the network packet.

16 Claims, 3 Drawing Sheets

ROUTING DEVICE AND METHOD FOR PROCESSING NETWORK PACKET THEREOF

TECHNICAL FIELD

The disclosure relates to a network device and a method for processing a network packet thereof, more particularly to a routing device and a method for processing a network packet thereof.

BACKGROUND

In a computer network, Network Address Translation (NAT) is a technology for rewriting a source Internet Protocol (IP) address or a destination IP address when a network packet passes through a router or a firewall. A NAT router between a local network and the Internet is capable of being connected to the Internet by using one or more public IP addresses provided by an Internet Service Provider (ISP) and performing NAT translation on the private IP address of a client in the local network for the subsequent connection to, the Internet.

However, to perform NAT, a NAT router needs to examine one by one whether all the received network packets meet the data in a NAT mapping table. If the information of a network packet cannot be found in the table, it needs to be determined by a large amount of preset rules whether the network packet needs NAT including its processes of learning and translation. Also, all network packets need to be transferred to a core unit through a driving unit of a NAT server and then a core unit performs determination, learning or translation.

Once a network packet is transferred to a core unit, whether necessary or not, examination and processing in the layers such as a Medium Access Control (MAC) layer, an IP layer or a Transmission Control Protocol (TCP) layer are performed. Therefore, a large amount of time is wasted in computation and processing for a simple NAT translation with data already stored in a table, resulting in a packet delay. Moreover, for a local network that requires NAT translation, basically all packets need NAT translation, which accordingly deteriorates the packet delay problem because of a large amount of translation demands.

SUMMARY

In an embodiment, the disclosure provides a method for processing a network packet. The method is configured for a routing apparatus. The routing apparatus comprises a forwarding engine module and a core module. In the method, a network packet from a source interface is received. Whether or not the network packet meets a Network Address Translation (NAT) packet condition is determined. Subsequently, the following steps are executed when the network packet meets the NAT packet condition. In these steps, transmission information of the network packet is read and a NAT mapping table is searched by using the transmission information. When a mapping entry corresponding to the transmission information is found in the NAT mapping table, the method involves enabling the forwarding engine module to update the header of the network packet according to the NAT forwarding information of the corresponding mapping entry and to set a destination interface of the network packet.

The disclosure further provides a routing device comprising a forwarding engine module and a core module. The forwarding engine module is configured for executing the steps including receiving a network packet from a source interface and determining whether the network packet meets a Network Address Translation (NAT) packet condition. When the network packet meets the NAT packet condition, the following steps are further executed. These steps are: reading transmission information of the network packet and searching a NAT mapping table by using the transmission information; when a mapping entry corresponding to the transmission information is found in the NAT mapping table, according to NAT forwarding information of the corresponding mapping entry, updating the header of the network packet and setting a destination interface of the network packet and when the network packet does not meet the NAT packet condition, forwarding the network packet. The core module is configured for receiving the network packet that does not meet the NAT packet condition from the forwarding engine module, and for processing the network packet that does not meet the NAT packet condition or the network packet that does not correspond to any of the mapping entry in the NAT mapping table.

BRIEF DESCRIPTION OF THE DRAWINGS

The disclosure will become more fully understood from the detailed description given herein below for illustration only, thus does not limit the disclosure, wherein.

DETAILED DESCRIPTION

Figure 1B:
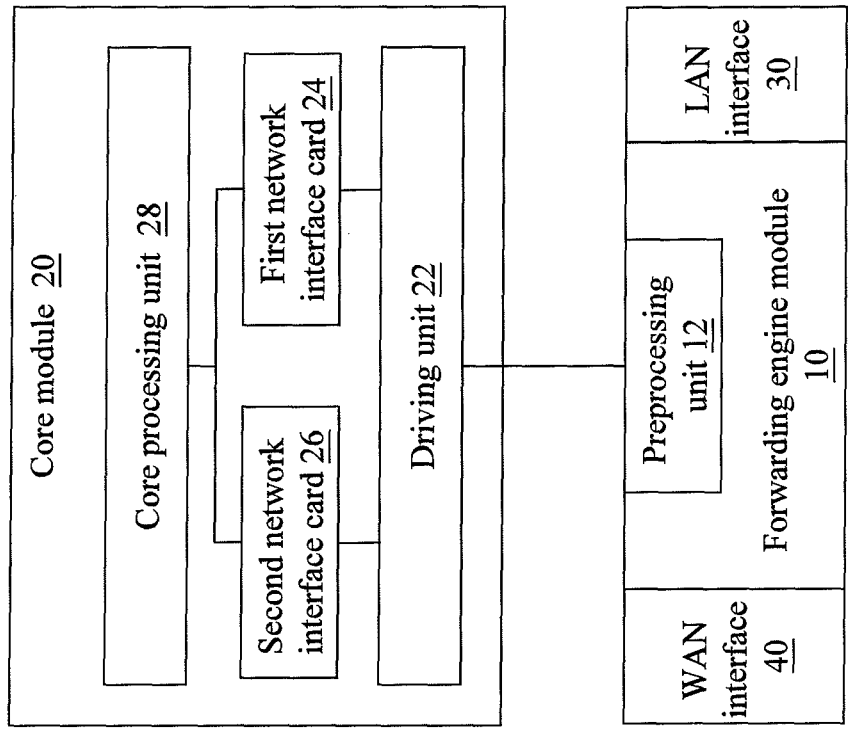
FIG. 1B is a block diagram of a routing device in another embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure provides a routing device and a method for processing a network packet thereof. The routing device is configured for executing the method for processing the network packet, so as to accelerate the processing of a network packet.

Figure 1A:
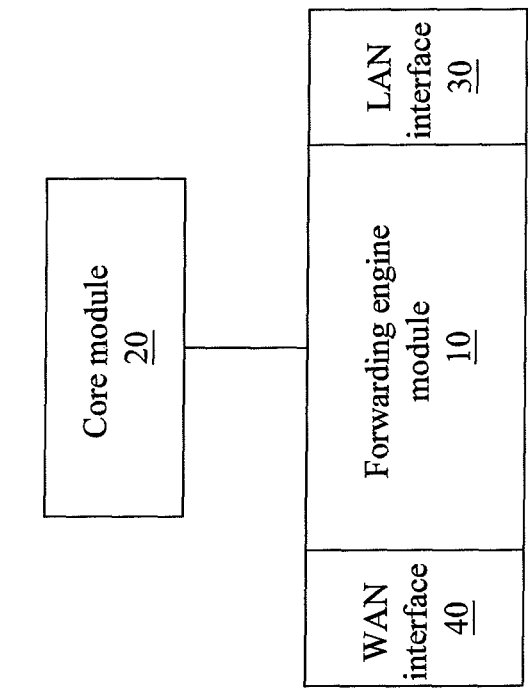
FIG. 1A is a block diagram of a routing device in an embodiment.

Please refer to FIG. 1A. FIG. 1A is a block diagram of a routing device in an embodiment. The routing device comprises a forwarding engine module 10 and a core module 20 to process at least one received network packet. The routing device, in this and some embodiments, further comprises a Local Area Network (LAN) interface 30 and a Wide Area Network (WAN) interface 40 to access a LAN domain and a WAN domain, respectively.

In a NAT mode, the routing device regards a LAN domain as a private domain and regards a WAN domain as a public domain. The routing device is configured for processing a network packet received from the LAN domain and then sending the processed packet to the WAN domain and is also configured for processing a network packet received from the WAN domain and then sending the processed network packet to the LAN domain.

Specifically, the routing device is at least configured for processing a network packet in a physical layer, a MAC layer, and an IP layer, but as demanded, is also configured for processing a network packet in an upper layer such as a TCP layer or an application layer. Therefore, in different embodiments, the routing device is configured for fulfilling the function of a bridge, a switch or a router. With more advanced functions, the routing device is also configured for serving as an advanced network device such as a gateway or a proxy server.

Additionally, the routing device is installed with a built-in Real-Time Operating System (RTOS) such as a VxWorks operating system. VxWorks is a highly effective and highly stable Unix-like operating system and adopts a very flexible protocol stack to process network packets.

Please refer to FIG. 1B. FIG. 1B is a block diagram of a routing device in another embodiment. The forwarding engine module 10, in this and some embodiments, comprises a preprocessing unit 12 and the preprocessing unit 12 executes the method for processing the network packet. In this and some embodiments, the core module 20 comprises a driving unit 22, a first Network Interface Card (NIC) 24, a second NIC 26, and a core processing unit 28.

The driving unit 22 is configured for receiving a network packet from or sending a network packet to the forwarding engine module 10. Specifically, the forwarding engine module 10, in this and some embodiments, has a local interface (not shown) and communicates with the core module 20 through the local interface and the driving unit 22. However, for the core module 20, the local interface can be viewed as a buffer for maintaining reception and sending of a network packet of the driving unit 22 only. In practice, the LAN interface 30 or the WAN interface 40 is still configured for external communication.

The first NIC 24 is configured for corresponding to a LAN domain end of the routing device, the second NIC 26 is configured for corresponding to a WAN domain end, and the first NIC 24 and the second NIC 26 have different MAC addresses. In the embodiment in FIG. 1B, the first NIC 24 is configured for corresponding to the LAN interface 30, the second NIC 26 is configured for corresponding to the WAN interface 40, and the LAN interface 30 and the WAN interface 40 have a corresponding port number, respectively.

The core processing unit 28 has a processing capability higher than that of the preprocessing unit 12 and is configured for processing fragmentation, IP version 4 (IPv4) and IP version 6 (IPv6) translation or NAT learning for a network packet. Conventionally, all network packets are processed by a core processing unit 28. In the method for processing the network packet, by comparison, a part of the network packets are processed by the preprocessing unit 12, so as to reduce the load of the core processing unit 28 and enhance the overall processing efficiency of the routing device.

Figure 2:
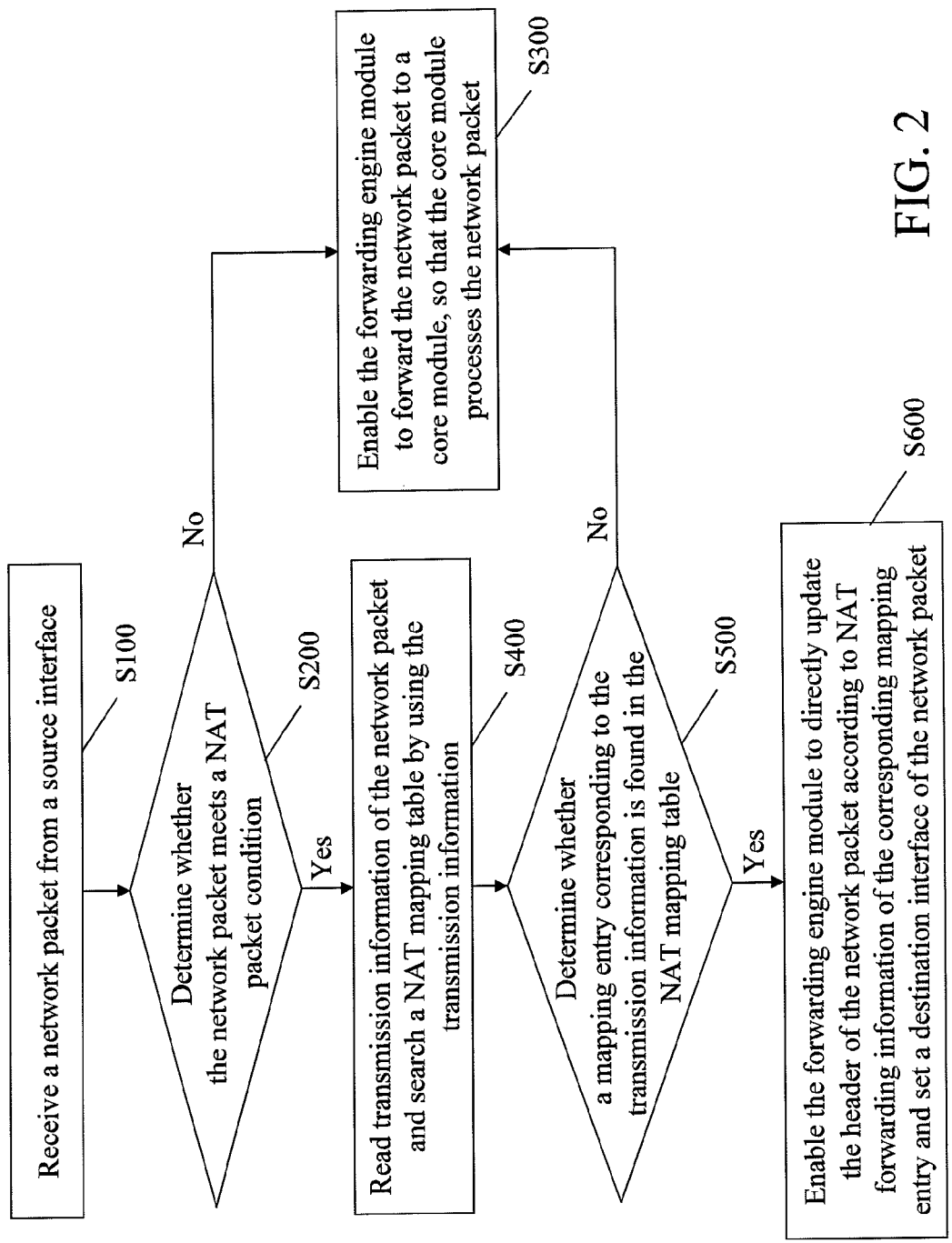
FIG. 2 is a flow chart of a method for processing a network packet in an embodiment.

Please refer to FIG. 2. FIG. 2 is a schematic flow chart of a method for processing a network packet in an embodiment.

A routing device receives a network packet from a source interface (Step S100). In this and some other embodiments, the source interface is a LAN interface 30 or a WAN interface 40. In other words, the network packet is transferred from a WAN domain into a LAN domain or is transferred from a LAN domain into a WAN domain. Upon receiving a network packet from a source interface, the preprocessing unit 12 reads the header of the network packet first to determine whether the network packet meets a NAT packet condition (Step S200).

The NAT packet condition, in this and some other embodiments, includes the conditions shown as below:
 a. The network packet is an IPv4 packet.
 b. When the network packet adopts the TCP, the network packet does not have a synchronize (SYN) flag, a finish (FIN) flag or a RESET flag. In other words, the network packet is merely a data packet configured for transferring data rather than a control packet configured for network control.
 c. The network packet does not adopt an application-layer (or application-level) gateway (ALG) service.
 d. The network packet does not adopt the Internet Control Message Protocol (ICMP).
 e. The network packet is not fragmented in the IP layer.

When the network packet does not meet the NAT packet condition, that is, does not meet any of the above conditions a to e, the preprocessing unit 12 enables the forwarding engine module 10 to forward the network packet to a core module 20, so that the core module 20 processes the network packet that does not meet the NAT packet condition (Step S300). That is, the core module 20 is configured for receiving from the forwarding engine module 10 a network packet that does not meet the NAT packet condition and processing the network packet that does not meet the NAT packet condition.

When the network packet does not meet the condition a, it indicates that the network packet is an IPv6 packet. It might be necessary to determine, according to the specification of the routing device, whether IPv6 and NAT translation is required for the network packet.

When the network packet does not meet the condition b, it indicates that the network packet is a control packet. When the network packet does not meet the condition c, it indicates that processing related to the ALG service is required for the network packet. When the network packet does not meet the condition d, it indicates that ICMP related processing is required for the network packet. Complicated processing is required in all these cases and processing, therefore, is performed by the core processing unit 28.

When the network packet does not meet the condition e, it indicates that the network packet has already been fragmented by other network devices before. To perform network control, it might be necessary to perform reordering, reassembly or re-fragmentation in combination with other network packets. As complicated processing is also required for these operations, the processing is performed by the core processing unit 28.

In contrast, when the network packet meets the NAT packet condition (namely when the network packet meets all the conditions a to e), the preprocessing unit 12 is configured for executing Step S400, Step S500, and Step S600, or executing Step S400, Step S500, and Step S300. In Step S200, the preprocessing unit 12 filters a data packet for which only NAT translation is required while other complicated processing is not required. Subsequently, NAT translation is performed on the data packet through Step S400 to Step S600.

When the network packet meets the NAT packet condition, the preprocessing unit 12 reads the transmission information of the network packet and searches a NAT mapping table by using the transmission information (Step S400). Also, the preprocessing unit 12 determines whether a mapping entry corresponding to the transmission information is found in the NAT mapping table (Step S500).

According to an embodiment, the core processing unit 28 of the core module 20 maintains the NAT mapping table, in which at least one mapping entry is provided. Each mapping entry comprises corresponding transmission information and NAT forwarding information, and the mapping entry is configured for meeting the format of a NAP tuple. The NAT forwarding information, in some or other embodiments, comprises a NAT address and a NAT port number. However, in the NAT mapping table, as demanded, more related information may be recorded to enable the core module 20 to fulfill advanced network control functions.

The preprocessing unit 12 is configured for reading session information of the network packet as the transmission information first. The format of the session information, in this and some other embodiments, is a 5-tuple, and comprises a source IP address, a source port number, a communication protocol, a destination IP address, and a destination port number. The preprocessing unit 12 translates the read transmission information into the format of a NAP tuple and then searches a NAT mapping table to determine whether the transmission information of any mapping entry is the same as the transmission information of the current network packet.

When no mapping entry in the NAT mapping table corresponds to the transmission information, it indicates that NAT translation cannot be directly performed on this network packet with the existing information. Hence, NAT learning needs to be performed first. The NAT learning and the processing required for maintaining a NAT mapping table, as being more complicated than direct NAT translation, can be both executed by the core processing unit 28. Therefore, Step S300 is sill executed when no mapping entry in the NAT mapping table corresponds to the transmission information, so that the core module 20 processes this network packet.

In contrast, when a mapping entry corresponding to the transmission information is found in the NAT mapping table, the forwarding engine module 10 is enabled to directly update the header of the network packet according to NAT forwarding information of the corresponding mapping entry and set a destination interface of the network packet (Step S600). In other words, the preprocessing unit 12 performs NAT translation on the network packet. The destination interface is a LAN interface 30 or a WAN interface 40, and the source interface and the destination interface are different.

Figure 3:
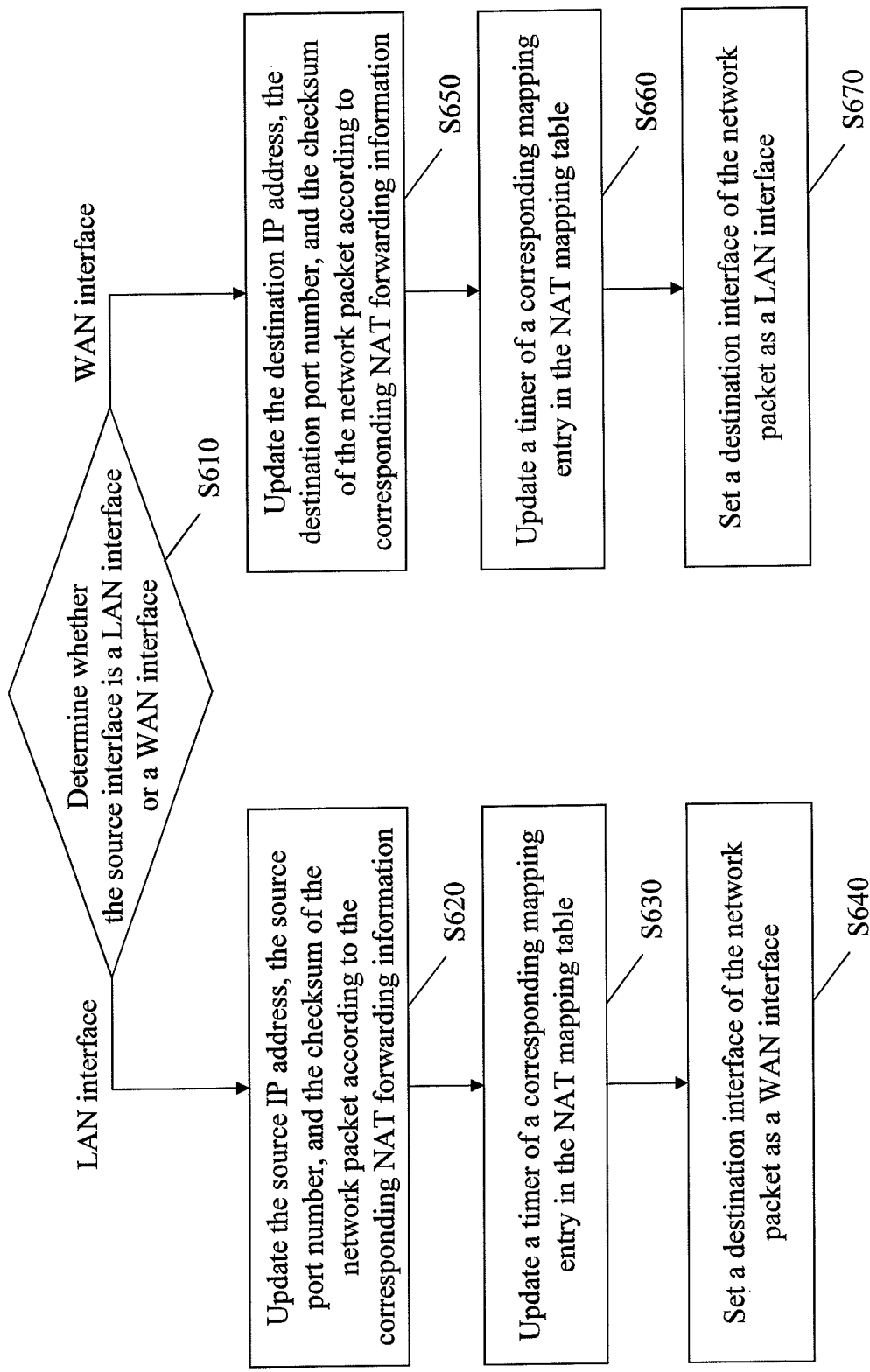
FIG. 3 is a flow chart of Step S600 in an embodiment.

Please refer to FIG. 3. FIG. 3 is a schematic flow chart of Step S600 in an embodiment.

After a mapping entry corresponding to the transmission information is found in the NAT mapping table, the preprocessing unit 12 is first configured for determining whether the source interface is a LAN interface 30 or a WAN interface 40 (Step S610).

When being a LAN interface 30, the source interface is configured for executing Step S620 to Step S640 below. The preprocessing unit 12 is configured for updating the source IP address, the source port number, and a checksum of the network packet according to the corresponding NAT forwarding information (Step S620). The preprocessing unit 12 is configured for replacing the source IP address in the header of the network packet in the IP layer with the NAT address, and the source port number in the header with the NAT port number. Also, the preprocessing unit 12 recalculates a checksum of the corresponding header according to the changed header, so as to prevent the network packet from being regarded as an error packet by a subsequent network apparatus because the checksum does not correspond to the header.

Additionally, the preprocessing unit 12 updates a timer of a corresponding mapping entry in the NAT mapping table (Step S630). In the NAT mapping table, one timer is set for each mapping entry to guarantee the timeliness of the mapping entry. The timer of the mapping entry is updated by the preprocessing unit 12 or the core processing unit 28 when the mapping entry is used in the NAT translation. In a technology with a timer, when a predetermined threshold value is exceeded, it indicates that the mapping entry has not been used within a predetermined period of time, so that such a mapping entry can be removed by the core processing unit 28.

After the header of the network packet is updated, the preprocessing unit 12 sets a destination interface of the network packet as a WAN interface 40 (Step S640) to send the network packet from the WAN interface 40 to the WAN domain.

When the source interface is a WAN interface 40, the preprocessing unit 12 executes Step S650 to Step S670. The preprocessing unit 12 updates the destination IP address, the destination port number, and a checksum of the network packet according to corresponding NAT forwarding information (Step S650) and updates a timer of the corresponding mapping entry in the NAT mapping table (Step S660). The preprocessing unit 12 is configured for replacing the destination IP address in the header of the network packet in the IP layer with the IP address of the corresponding LAN domain end in the found mapping entry and replacing the destination port number in the header with the port number of the corresponding LAN domain end in the found mapping entry.

Also, the preprocessing unit 12 recalculates the checksum of the corresponding header according to the changed header and updates the timer of the found mapping entry. Next, the preprocessing unit 12 is configured for setting a destination interface of the network packet as a LAN interface 30 (Step S670), so as to send the network packet from the LAN interface 30 to the LAN domain.

In conclusion, in the routing device and the method for processing the network packet thereof, a network packet that only requires NAT translation and has corresponding NAT forwarding information stored in a NAT mapping table is able to be filtered, and the preprocessing unit of the forwarding engine module performs NAT translation on the network packet instead of transferring the network packet to the core module for processing. According to statistics, about 50% to 60% of the network packets are such data packets that only require NAT translation, and thus the preprocessing unit is configured for processing more than half of the network packets through simple operations. Therefore, the load of a core processing unit is reduced and a packet delay is significantly reduced, thereby enhancing the overall processing efficiency of the routing device.

What is claimed is:

1. A method for processing a network packet, the method being configured for a routing apparatus, the routing apparatus comprising a forwarding engine module and a core module, and the method for processing the network packet comprising:

receiving a network packet from a source interface;
   determining whether the network packet meets a Network Address Translation (NAT) packet condition; and
   when the network packet meets the NAT packet condition, executing the following steps:
   reading transmission information of the network packet and searching a NAT mapping table by using the transmission information;
   when a mapping entry corresponding to the transmission information is found in the NAT mapping table, enabling the forwarding engine module to update the header of the network packet according to NAT forwarding information of the corresponding mapping entry and to set a destination interface of the network packet; and
   when all of the mapping entry in the NAT mapping table do not corresponds to the transmission information, enabling the forwarding engine module to forward the network packet to the core module, so that the core module processes the network packet.

2. The method for processing the network packet according to claim 1, further comprising:

when the network packet does not meet the NAT packet condition, enabling the forwarding engine module to forward the network packet to the core module, so that the core module processes the network packet.

3. The method for processing the network packet according to claim 1, wherein the NAT packet condition is that:
the network packet is an Internet Protocol version 4 (IPv4) packet;
when the network packet adopts the Transmission Control Protocol (TCP), the network packet does not have a synchronize (SYN) flag, a finish (FIN) flag or a RESET flag;
the network packet does not adopt an application-layer (or application-level) gateway (ALG) service;
the network packet does not adopt the Internet Control Message Protocol (ICMP); and
the network packet is not fragmented in an Internet protocol (IP) layer.

4. The method for processing the network packet according to claim 1, wherein the transmission information comprises a source IP address, a source port number, a communication protocol, a destination IP address, and a destination port number.

5. The method for processing the network packet according to claim 4, wherein the source interface and the destination interface are a Local Area Network (LAN) interface or a Wide Area Network (WAN) interface, and the source interface and the destination interface are different.

6. The method for processing the network packet according to claim 5, wherein the step of enabling the forwarding engine module to update the header of the network packet according to the NAT forwarding information of the corresponding mapping entry and setting the destination interface of the network packet comprises:
when the source interface is the LAN interface, executing the following steps:
according to the corresponding NAT forwarding information, updating the source IP address, the source port number and a checksum of the network packet;
updating a tinier of the corresponding mapping entry in the NAT mapping table; and
setting the destination interface of the network packet as the WAN interface.

7. The method for processing the network packet according to claim 6, wherein the step of enabling the forwarding engine module to update the header of the network packet according to the NAT forwarding information of the corresponding mapping entry and setting the destination interface of the network packet further comprises:
when the source interface is the WAN interface, executing the following steps:
updating the destination IP address, the destination port number, and the checksum of the network packet according to the corresponding NAT forwarding information;
updating the timer of the corresponding mapping entry in the NAT mapping table; and
setting the destination interface of the network packet as the LAN interface.

8. The method for processing the network packet according to claim 1, wherein the NAT forwarding information comprises a NAT address and a NAT port number.

9. The method for processing the network packet according to claim 1, wherein the NAP mapping table is maintained by the core module.

10. A routing device, comprising:
a forwarding engine module configured for executing the following steps:
receiving a network packet from a source interface;
determining whether the network packet meets a Network Address Translation (NAT) packet condition; and
when the network packet meets the NAT packet condition, executing the following steps:
reading transmission information of the network packet and searching a NAT mapping table by using the transmission information;
when a mapping entry corresponding to the transmission information is found in the NAT mapping table, according to NAT forwarding information of the corresponding mapping entry, updating the header of the network packet and setting a destination interface of the network packet; and
when the network packet does not meet the NAT packet condition, forwarding the network packet; and
a core module configured for receiving the network packet that does not meet the NAT packet condition from the forwarding engine module, and for processing the network packet that does not meet the NAT packet condition or the network packet that does not correspond to any of the mapping entry in the NAT mapping table;
a Local Area Network (LAN) interface; and
a Wide Area Network (WAN) interface;
wherein the source interface is the LAN interface or the WAN interface, the destination interface is the LAN interface or the WAN interface, and the source interface and the destination interface are different.

11. The routing device according to claim 10, wherein the NAT packet condition is that:
the network packet is an Internet Protocol version 4 (IPv4) packet,
when the network packet adopts the Transmission Control Protocol (TCP), the network packet does not have a synchronize (SYN) flag, a finish (FIN) flag or a RESET flag,
the network packet does not adopt an application-layer (or application-level) gateway (ALG) service,
the network packet does not adopt the Internet Control Message Protocol (ICMP), and
the network packet is not fragmented in an Internet protocol (IP) layer.

12. The routing device according to claim 10, wherein the transmission information comprise a source IP address, a source port number, a communication protocol, a destination IP address, and a destination port number.

13. The routing device according to claim 12, wherein the source interface is the LAN interface and the forwarding engine module executes the following steps:
according to the corresponding NAT forwarding information, updating the source IP address, the source port number, and a checksum of the network packet of the network packet;
updating a timer of the corresponding mapping entry in the NAT mapping table; and
setting the destination interface of the network packet as the WAN interface.

14. The routing device according to claim 13, wherein, when the source interface is the WAN interface, the forwarding engine module executes the following steps:
updating the destination IP address, the destination port number, and the checksum of the network packet according to the corresponding NAT forwarding information;
updating the timer of the corresponding mapping entry in the NAT mapping table; and setting the destination interface of the network packet as the LAN interface.

15. The routing device according to claim 10, wherein the NAT forwarding information comprises a NAT address and a NAT port number.

16. The routing device according to claim 10, wherein the NAP mapping table is maintained by the core module.

* * * * *